(12) United States Patent
Ciuk et al.

(10) Patent No.: US 11,973,382 B2
(45) Date of Patent: Apr. 30, 2024

(54) DEVICE FOR POSITIONING ELECTRICALLY CONDUCTIVE SEGMENTS OF A WINDING OF A STATOR

(71) Applicant: Valeo Electric and Electronic Systems Sp. z o.o., Czechowice (PL)

(72) Inventors: Daniel Ciuk, Czechowice (PL); Wojciech Mandok, Czechowice (PL); Miroslaw Skrzypczak, Czechowice (PL); Marcin Zebrowski, Czechowice (PL)

(73) Assignee: Valeo Electric and Electronic Systems Sp. z o.o., Czechowice (PL)

( * ) Notice: Subject to any disclaimer, the term of this patent is extended or adjusted under 35 U.S.C. 154(b) by 3 days.

(21) Appl. No.: 17/448,128

(22) Filed: Sep. 20, 2021

(65) Prior Publication Data
US 2022/0094246 A1 Mar. 24, 2022

(30) Foreign Application Priority Data
Sep. 24, 2020 (EP) ..................................... 20198239

(51) Int. Cl.
*H02K 15/00* (2006.01)
*H02K 15/02* (2006.01)
*H02K 15/085* (2006.01)

(52) U.S. Cl.
CPC ..... *H02K 15/0068* (2013.01); *H02K 15/0087* (2013.01); *H02K 15/024* (2013.01); *H02K 15/085* (2013.01)

(58) Field of Classification Search
CPC .................. H02K 15/0068; H02K 15/0087
See application file for complete search history.

(56) References Cited

U.S. PATENT DOCUMENTS

2018/0166796 A1   6/2018   Yanagisawa et al.
2020/0204048 A1   6/2020   Matznick et al.

FOREIGN PATENT DOCUMENTS

| CN | 210780439 U | 6/2020 |
| DE | 10 2018 202 381 A1 | 8/2019 |
| DE | 102018202381 A1 * | 8/2019 |
| DE | 10 2018 128 918 A1 | 5/2020 |

OTHER PUBLICATIONS

European Search Report dated Mar. 10, 2021 in European Application 20198239.4 filed on Sep. 24, 2020, citing documents AA-AB & AO-AQ therein, 9 pages (with Written Opinion).

* cited by examiner

*Primary Examiner* — Livius R. Cazan
(74) *Attorney, Agent, or Firm* — Oblon, McClelland, Maier & Neustadt, L.L.P.

(57) ABSTRACT

A device for positioning electrically conductive segments of a winding of a stator of a rotary electrical machine, including at least one rotative ring with at least one cam arranged around a revolution axis, the rotative ring being arranged to set in a radial motion at least two series of fingers to ensure the position of the conductive segments, wherein the two series of fingers are set in motion in opposite directions one to the other, such that a finger of a first series of fingers and a finger of a second series of fingers are configured to press two conductive segments of a pair of segments against each other.

12 Claims, 9 Drawing Sheets

[fig 1]
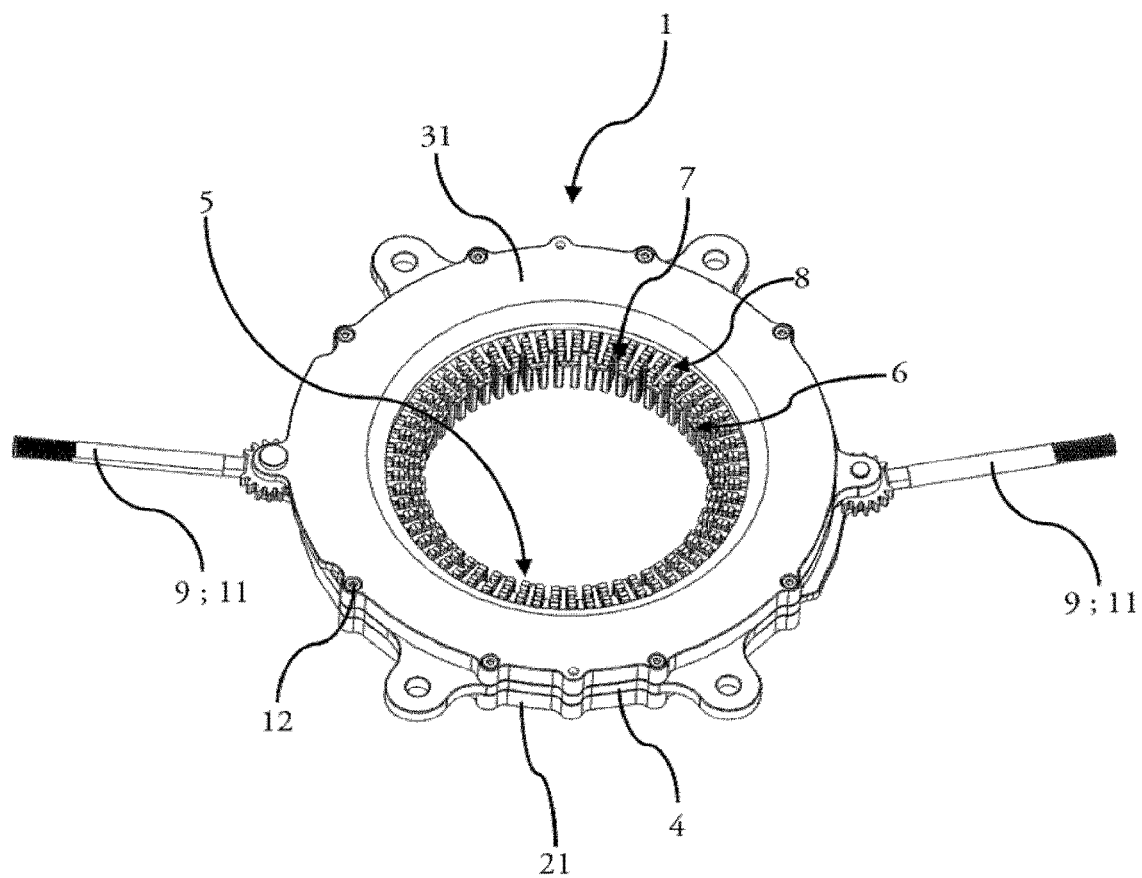

[fig 2]
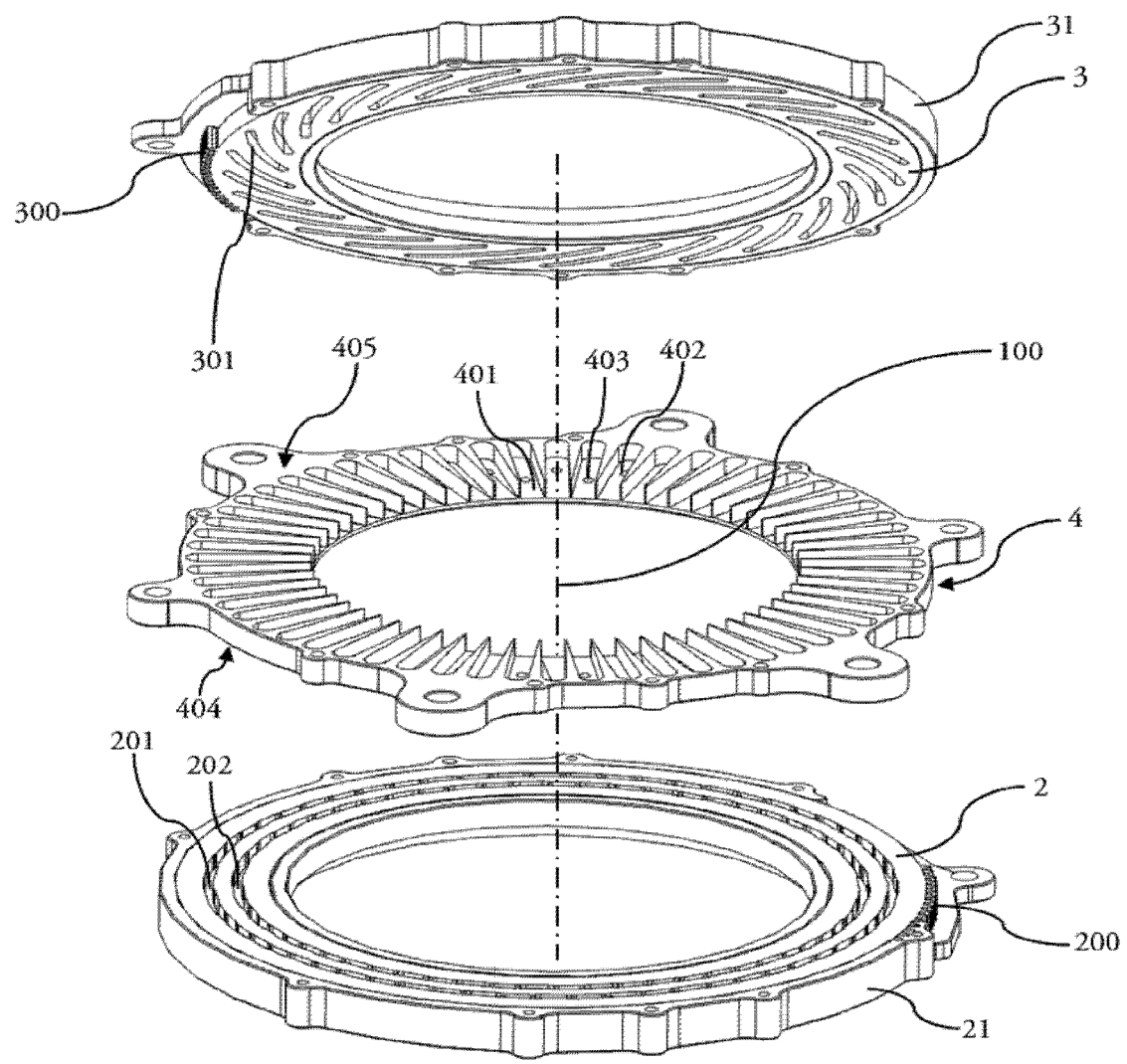

[fig 3]
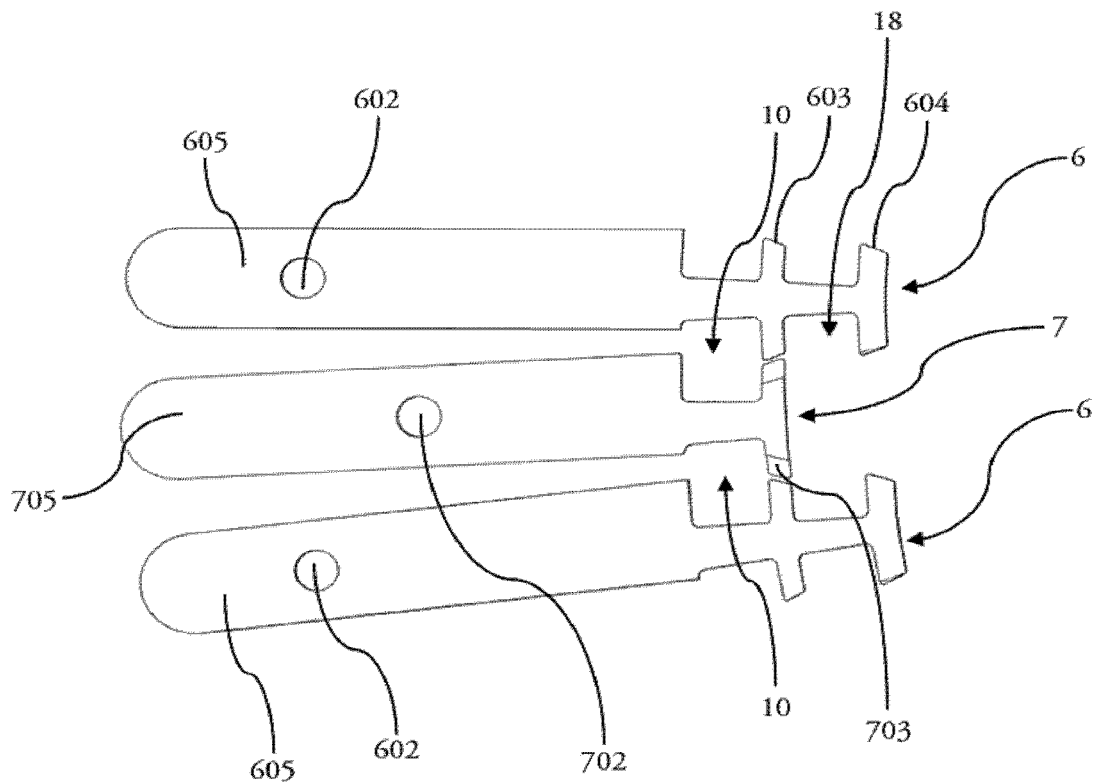
[fig 4]
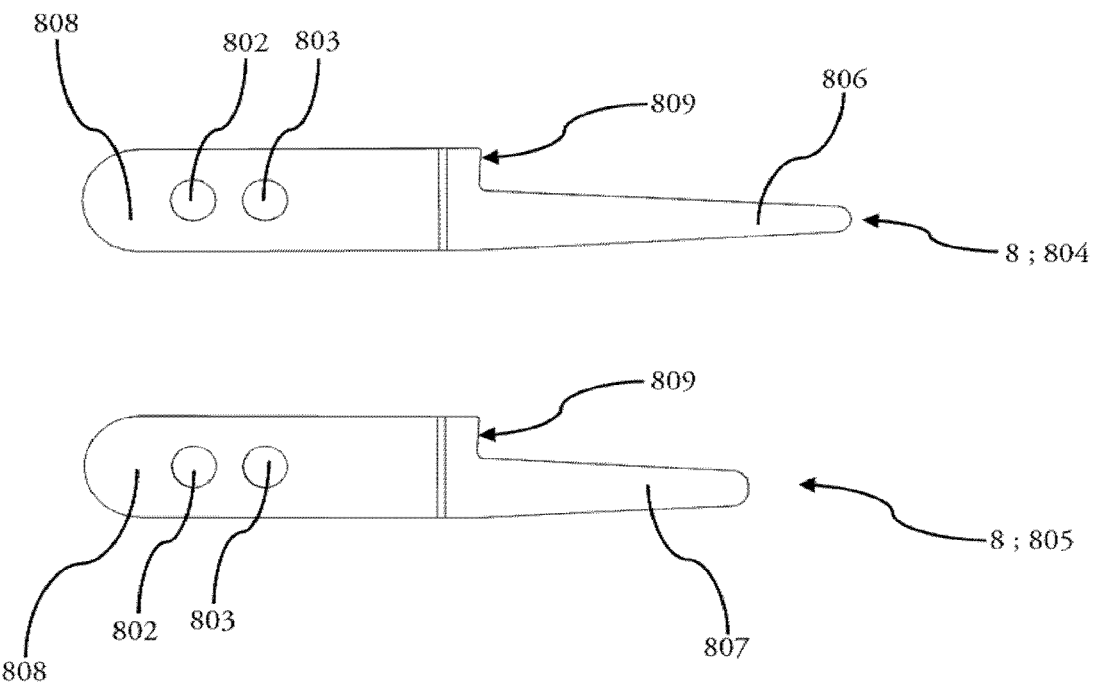

[fig 5]
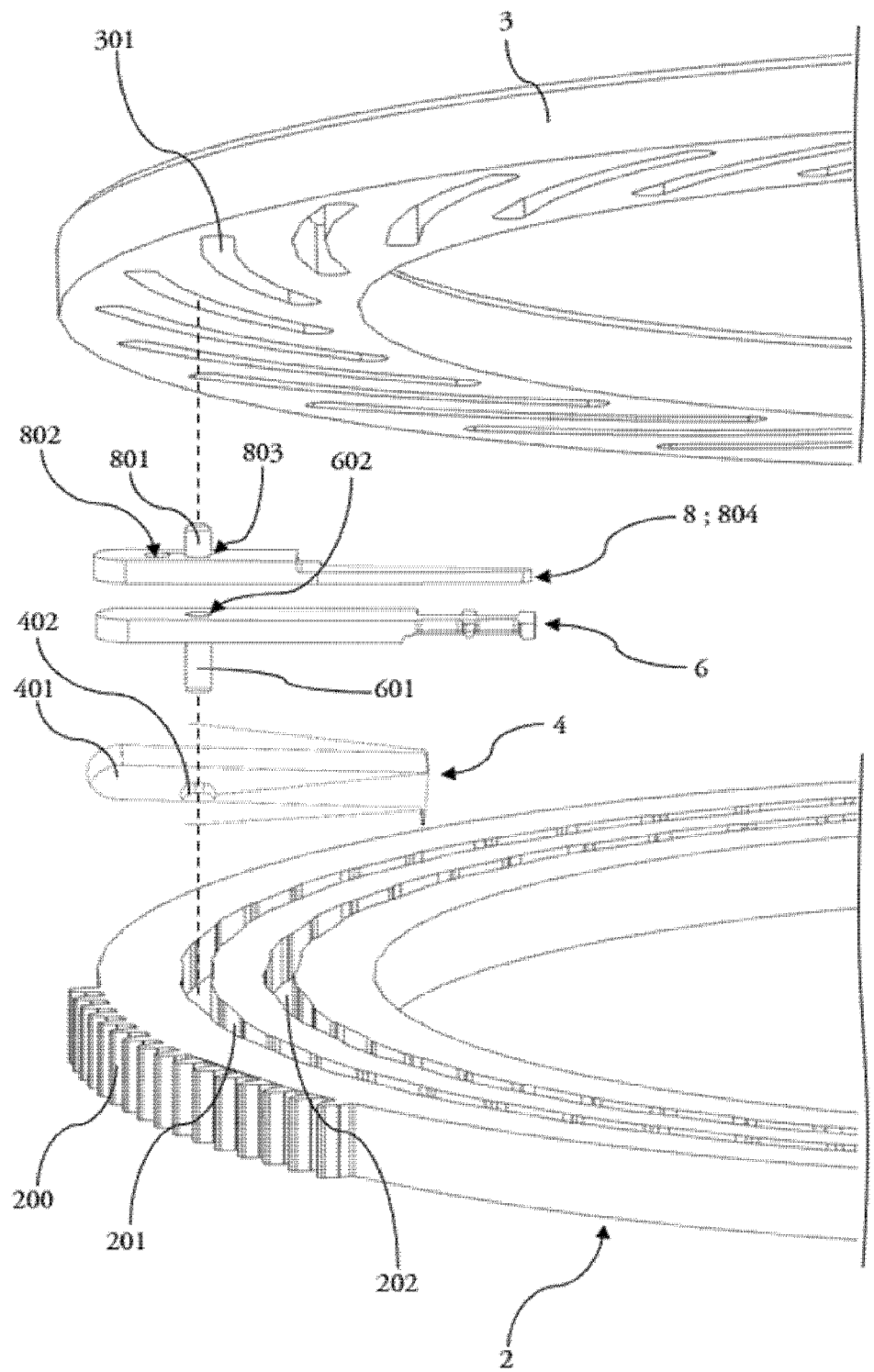

[fig 6]
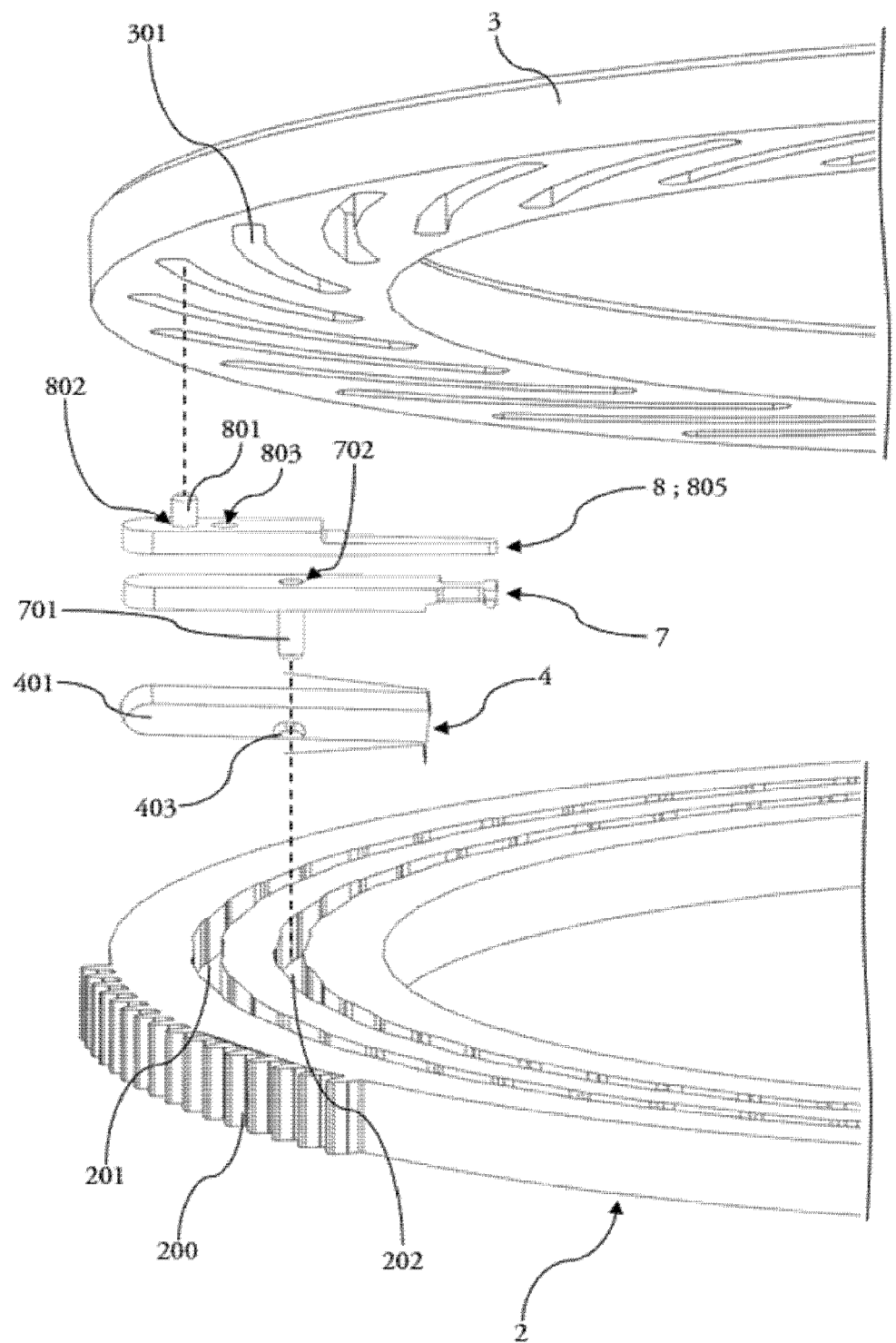

[fig 7]
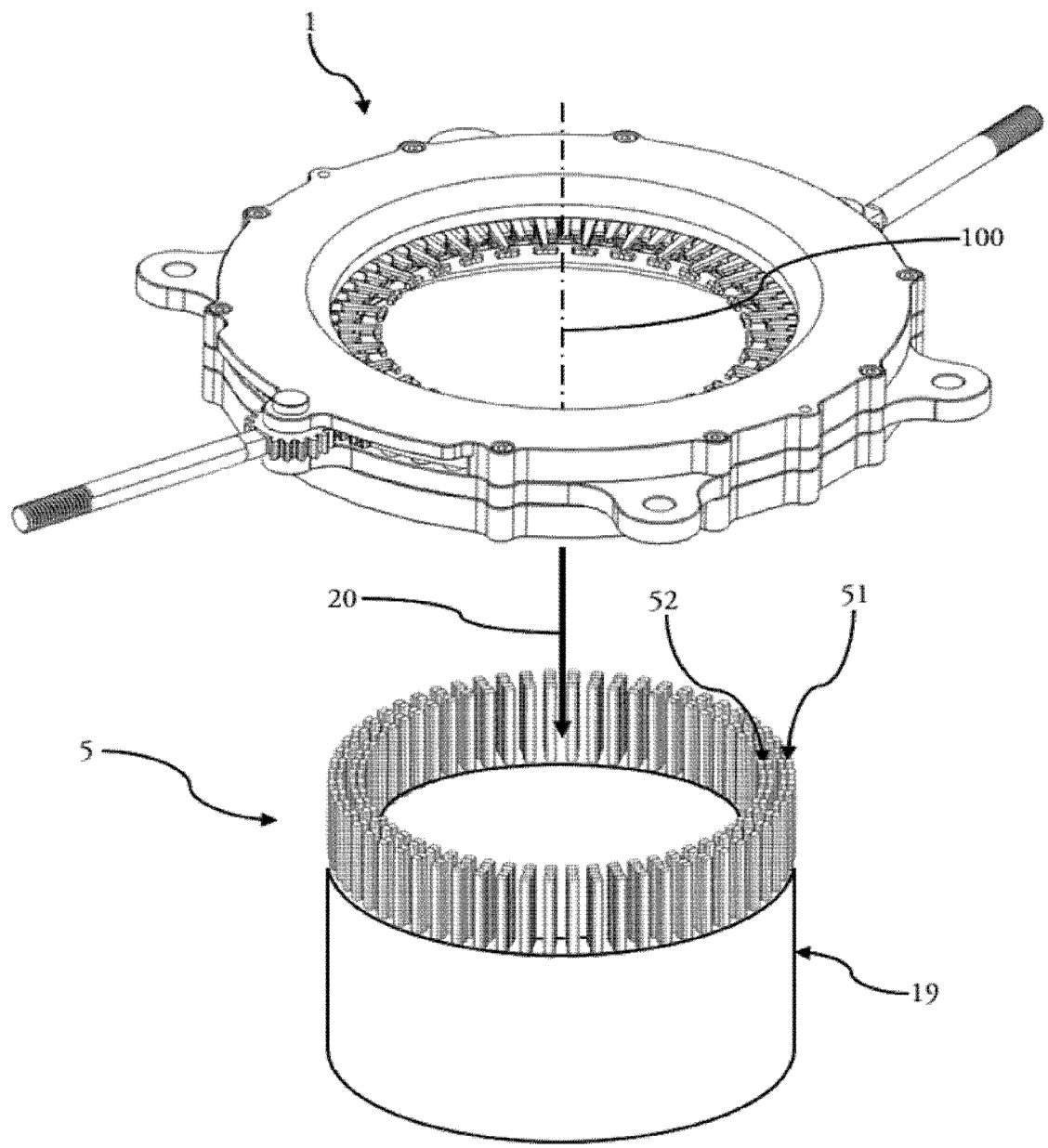

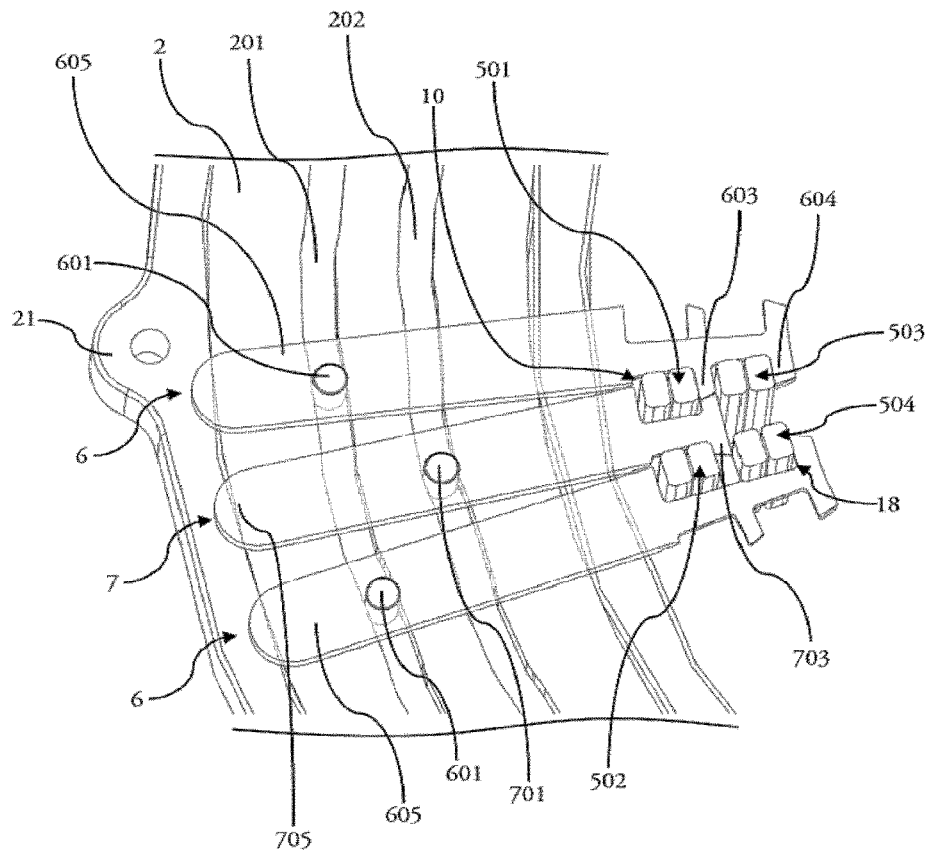
[fig 8]
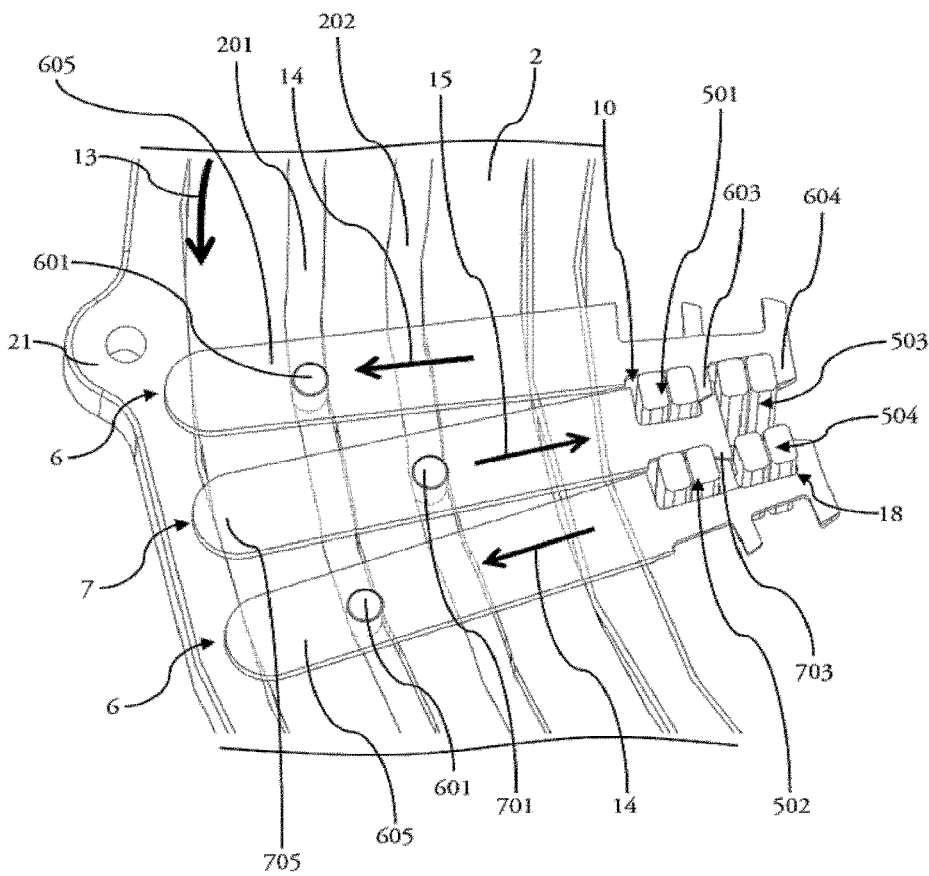
[fig 9]

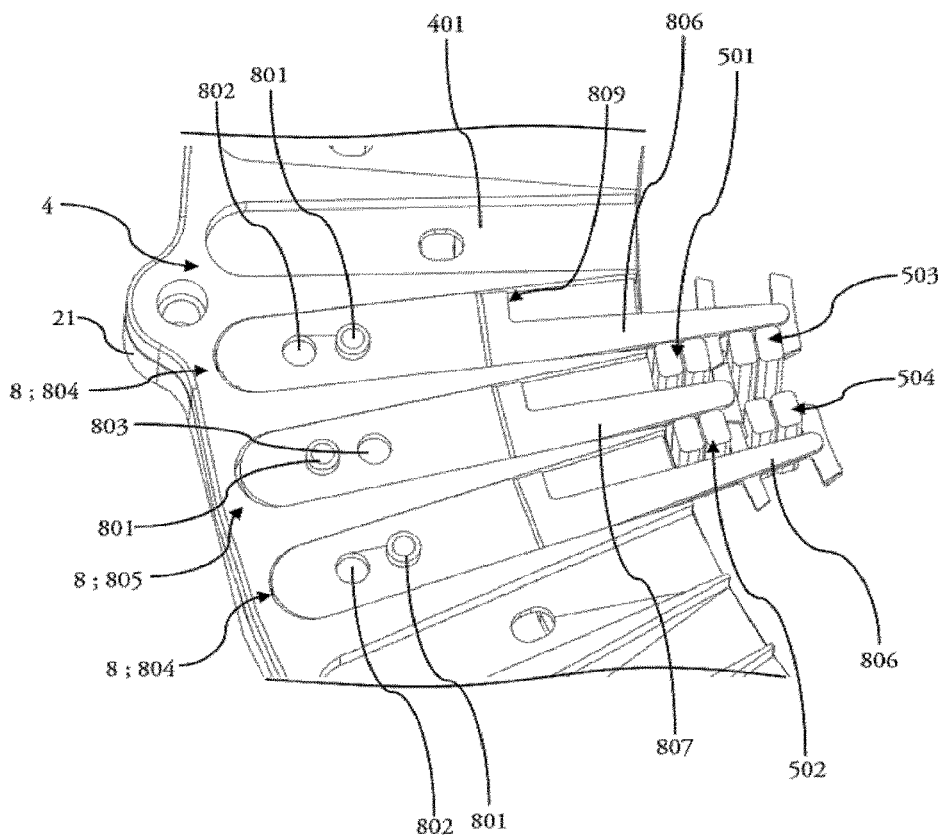
[fig 10]
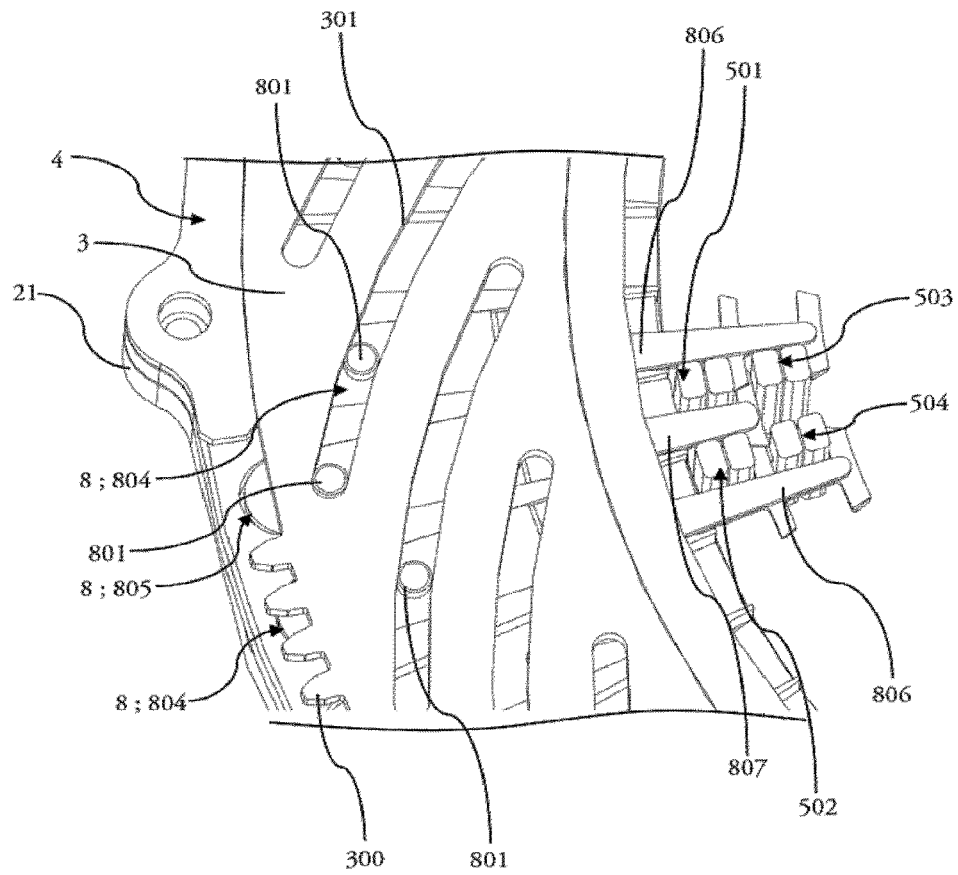
[fig 11]

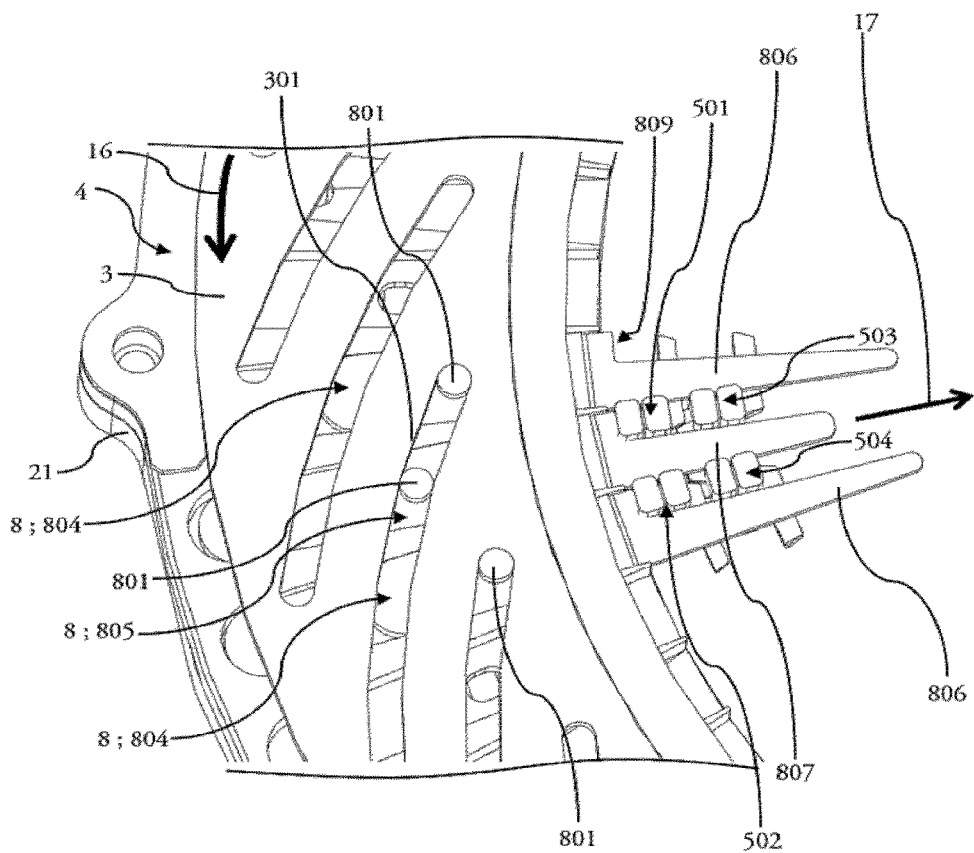
[fig 12]
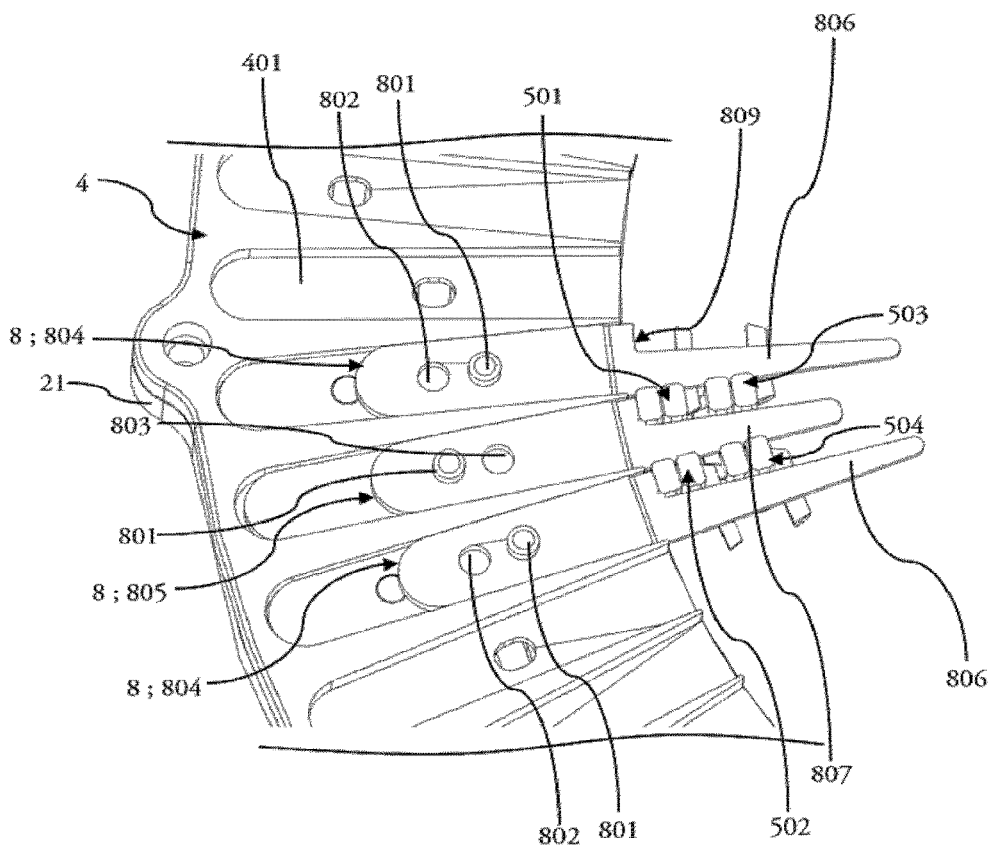
[fig 13]

DEVICE FOR POSITIONING ELECTRICALLY CONDUCTIVE SEGMENTS OF A WINDING OF A STATOR

The present invention concerns the welding of electrically conductive segments of a stator of a rotary electrical machine. More particularly, the invention relates to a device for positioning such electrically conductive segments of a stator before such welding.

In order to supply energy for an electric vehicle or a hybrid vehicle, it is known to use electric engines comprising a rotary electrical machine. Such rotary electrical machine comprises a rotor and a stator. In a layout of motor with internal rotor, the stator may consist in a cylindric element arranged around a revolution axis to receive the rotor which is equipped with magnetic elements. The stator comprises a stack of metallic pieces which defines teeth and a winding around each tooth. Thus, when the rotary electrical machine is operating in a motor mode, an electrical current passes across the winding, which allows the creation of a magnetic field by the coils of the stator, such magnetic field driving in rotation the rotor in order to ensure the propulsion of the vehicle. When the rotary electrical machine is operating in a generator mode, the rotational movement of the rotor allows the creation of a magnetic field into the stator, such magnetic field being turned into electrical current which passes across the winding of the stator to ensure the power supply of equipment of the vehicle.

The winding may be realized with a flexible electric wire which is wound successively around each tooth. Another solution, which allows a simplified assembly, is to use electrically conductive segments which are introduced separately in each groove between two successive teeth and whose free ends are welded one to another, in order to complete the connection of the winding. Such welding is for example made by laser welding, which guarantee more precision.

Despite such precision of welding tool, it must be noted that a correct welding may be reached only when the position of each end of each electrically conductive segment is close to its theoretical position. If the ends of two segments which are not supposed to be welded together are too close, the laser could make some wrong connections between segments during the welding. Conversely, if the ends of two segments which are supposed to be welded together are too far from each other, the laser could miss some electrical connections.

Tools are already known to ensure a separation between segments which should not be welded into each other, such tools consisting in a spacer inserted radially between two ends of segments before the welding step.

Other tools are known to ensure a radial alignment of ends of segments which must be welded into each other, such tools consisting in a radial finger inserted between two rows of ends of segments. Such a tool is efficient both to align ends of segments which must be welded together and to radially separate the rows of segments which have to be isolated from each other.

In each case the tool must be fixed to the stator in order not to move until the welding step is realized. It results that several tools cannot be used simultaneously, and that no device is known to ensure a complete separation between segments which should not be welded together. Moreover, such tools are not provided to ensure the positions close to each other of two ends of segments which must be welded together.

The present invention solves at least one of these problems by providing a device for positioning electrically conductive segments of a winding of a stator of a rotary electrical machine, comprising at least one rotative ring with at least one cam arranged around a revolution axis, the rotative ring being arranged to set in a radial motion at least two series of fingers to ensure the position of the conductive segments, wherein the two series of fingers are set in motion in opposite directions one to the other, such that a finger of a first series of fingers and a finger of a second series of fingers are configured to press two conductive segments of a pair of segments against each other.

The device of the invention at least ensures that all segments which must be fixed together are grouped, thereby facilitates the welding and guarantees a correct welding of all the winding of the stator. Such a device, and more particularly the layout of the fingers and the corresponding rotative ring, also help to separate from each other the segments which should not be welded together so as to avoid short circuits.

The device is placed on the winding of the stator in order that the series of fingers mechanically may interact with the electrically conductive segments. The rotative ring comprises at least a cam whose affects a position of the fingers of the related series of fingers when the rotative ring is in movement. Thereafter, by rotating the rotative ring, the series of fingers are moving according to a radial movement. Such movement of the series of fingers leads to a movement of the electrically conductive segments which interact with said fingers.

These electrically conductive segments are assembled by pairs, each segments of a pair of segments must be welded one to another. The device is put on the winding such that a finger of the first series of finger interact with a first segment of a pair while a finger of the second series of fingers interact with the second segment of that pair. Thanks to the motion in opposite directions of the first series of fingers and the second series of fingers, these fingers ensure a pressing of each segment of a pair of segments against each other.

According to an aspect of the invention, the first series of fingers and the second series of fingers are able to alternate between a resting position corresponding to an initial position of the fingers when the device is placed on the winding, and a working position, wherein these fingers press the two segments of each pair of segments against each other. When the first rotative ring is moved, the fingers of the first series and the second series of fingers are set in a radial motion in opposite directions and they press the two segments of each pair of segments against each other. In this situation, the fingers of the first series of fingers and the second series of fingers are in the working position and ensures their function during a welding operation.

According to an aspect of the invention, each finger of the first series of fingers and the second series of fingers is arranged according to an alternate manner, with a finger of the second series of fingers being adjacent in a circumferential direction to two fingers of the first series of fingers. The fingers of the first series of fingers and of the second series of fingers can be axially aligned or axially shifted.

According to an aspect of the invention, each finger of the first series of fingers and the second series of fingers are configured to press two pairs of conductive segments, one of said pairs of conductive segment being circumferentially shifted compared to the other one. Thus each finger is able to press the conductive segments of two adjacent slots. This allow to reduce the number of fingers of the first series of fingers and of the second series of fingers to simplify the device.

According to an aspect of the invention, the radial dimension of the fingers of the first series of fingers and the radial dimension of the fingers of the second series of fingers are different. The fingers moving in opposite radial directions, as explained above, the finger moving towards the outside of the device, opposite the axis of revolution, has a radial dimension greater than the radial dimension of the finger moving inward.

According to an aspect of the invention, the device comprises a first rotative ring and a second rotative ring, the first rotative ring being configured to set in a radial motion both first series of fingers and second series of fingers, the second rotative ring being configured to set in a radial motion a third series of fingers. The first rotative ring is configured to ensure the contact between each segment of a pair of segments via first and second series of fingers as explained above and the second rotative ring is configured to ensure an additional function of spacing circumferentially pairs of segments relative one to the other via another series of fingers. Moreover, this third series of fingers may ensure a complementary function of pressure regarding some pairs of segments which are not pressed by both first and second series of fingers.

The device can comprise a third series of fingers, which participates to the movement of the electrically conductive segments. Thus, in such configuration, the device comprises two rotative rings arranged to set in a radial motion three series of fingers.

The characteristic of two separate rotating rings makes it possible to perform several simultaneous functions of spacing of the segments which must be isolated and of bridging of the segments which must be welded together, with radial movements in opposite directions of some of the series of fingers and radial movements in the same direction of other series of fingers.

According to an aspect of the invention, the third series of fingers is configured to radially align the segments of each pair of segments. When the device is equipped with the third series of fingers, the segments of a pair of segments are not only pressed against each other, but they are also radially aligned such that the surface of contact between these two segments is improved. In other words, the radial alignment allows a better contact between the two segments of each pair of segments to ensure an optimal welding of such two segments of each pair of segments. Such a radial alignment, and such a third series of fingers allowing this radial alignment, also ensures a spacing between a radial alignment of pairs of segments and an adjacent radial alignment, to avoid short circuits.

According to an aspect of the invention, each finger of the third series of fingers comprises a shoulder configured to participate to the pressing of two conductive segments of a pair of segments against each other. When the third series of fingers is set in a radial motion by the second rotative ring, the stop of each finger of the third series of fingers may replace the function of one of the series of fingers associated to the first rotative cam and cooperates with the other series configured to be moved in a radial direction opposite to the radial motion of fingers of the third series of fingers.

In other words, the third series of fingers associated to the second rotative cam is configured to move in the same radial direction as one of the two series associated to the first rotative cam and the shoulder arranged on fingers of the third series is used to press a pair of segments with a finger of the other of the two series associated to the first rotative cam, moving in the opposite radial direction. In this paragraph, and in the rest of the specification, it has to be understood that the radial movement of the fingers are considered for the steps before the welding operation, leading the fingers to move from their resting position to their working position.

According to an aspect of the invention, each finger of the first series of finger and of the second series of fingers comprises a plurality of transversal protrusions. Such transversal protrusions allow to create some slots or some zones, which are configured to receive at least a pair of segments into each of these slots or zones. Thanks to the transversal protrusions, the slots and the zones are configured to create a prior separation of the pair of segments one to another. Moreover, such transversal protrusions allow contact between fingers and segments during the motion of the rotative rings and the corresponding fingers in order to press segments of a same pair against each other.

According to an aspect of the invention, the first rotative ring comprises a first cam which is configured to cooperate with each finger of the first series of fingers and a second cam which is configured to cooperate with each finger of the second series of fingers. The cams of the first rotative ring are arranged relative to each other in order to generate opposite radial movements of the first series of fingers and the second series of fingers when the first rotating ring is in movement.

According to an aspect of the invention, the first cam and the second cam have a circular and concentric form with ripples. The first cam and the second cam both extend on the first rotative ring to form a circle with a variable radius. The cams are realized in a concentric layout with a radial offset in order to not create interference, and to place each cam facing a part of the finger configured to cooperate with such cam.

According to an aspect of the invention, the first cam and the second cam are angularly offset one to the other, such offset being configured to shift time of the movement of the first series of fingers relative to the movement of the second series of fingers. In other words, the motion of the first series of fingers is delayed in time compared to the motion of the second series of fingers and each motion in opposite directions is not applied simultaneously. For example, the device is configured so that a rotation of the first rotative ring implies movements of both first and second series of fingers but with fingers of the first series of fingers which are leaving their resting position before the fingers of second series of fingers. In this example, the fingers of the first series of fingers first interact with a segment of the pair of segments to be pressed and they form a reference surface for this pressure action. Such time offset thus allows to avoid some potential mechanical interferences when the first series of fingers and the second series of fingers are in motion.

According to an aspect of the invention, the second rotative ring comprises a plurality of curved cams regularly and angularly distributed. A plurality of curved cams is arranged all on the surface of the second rotative rings, with providing enough material between the cams for the mechanical holding of the support.

As mentioned previously, when the second rotative ring is in motion, the fingers of the third series of fingers are set in a radial motion in order to radially align the segments of the stator and to participate to the pressing of such segments by pairs of segments thanks to their stop.

The third fingers are intended to move over a greater radial distance than the fingers of the other two series, and the device is provided with fingers of third series of fingers for each alignment of segments. It results from these two features that the form and the length of cams are different from that of the first ring.

According to an aspect of the invention, the curved cams have two opposite ends with one first end which is angularly offset relative to the second end. The angularly offset is such that a curved cam is configured to interact with at least two fingers of the third series of fingers.

According to an aspect of the invention, the device comprises a circular support with a plurality of guiding grooves configured to receive the series of fingers, wherein the first series of fingers and the second series of fingers are arranged in the plurality of guiding grooves such that the fingers of the first series of fingers and the fingers of the second series of fingers are arranged one to the other according to an alternate manner.

The circular support is thick enough to allow the formation of the guiding grooves, for example by molding. Each guiding groove presents a form which correspond to at least partially a form of any fingers of any series of fingers.

Each guiding groove comprising a finger of the first series of fingers is surrounded on each side by a guiding groove comprising a finger of the second series of fingers and vice versa. Such configuration is extended all along the circular support and for every guiding grooves. The alternation of first and second series of fingers ensures that several pairs of segments, at least each pairs of inner or outer peripheral pattern of pairs of segments, will interact both with a finger of the first series of fingers and a finger of the second series of fingers and more precisely with a finger of the first series of fingers and an adjacent finger of the second series of fingers.

It has to be noted that adjacent fingers are configured such that, in their resting position, they are forming frames within the segments can be inserted when the device is placed on the windings.

According to an aspect of the invention, the circular support is inserted between the two rotative rings.

According to an aspect of the invention, each rotative ring is arranged inside a fixed cover. Each cover comprises a housing having dimensions for receiving one of the rotative rings, each rotative ring being able to be set in rotative motion inside its cover.

According to an aspect of the invention, each guiding groove is configured to receive a finger of the third series of fingers and a finger of one of the first or the second series of fingers. Each guiding groove is deep enough to receive at least two fingers superposed one on the other.

According to an aspect of the invention, the guiding grooves are configured to ensure the radial movement of each finger which is located in said groove. The guiding grooves are such that the radial movement initiated by the rotative ring is the only movement authorized by each finger arranged in the guiding grooves.

According to an aspect of the invention, the third series of fingers comprises long fingers and short fingers, such long fingers being superposed to the fingers of the first series of fingers in each guiding grooves, such short fingers being superposed to the fingers of the second series of fingers in each guiding grooves. Generally speaking, the length of each finger of the third series of fingers depends on the length of the finger on which the finger of the third series of fingers is superposed. Thus, the fingers of the third series of fingers are against all the surface of the fingers of both first series of fingers and second series of fingers, in order to maximize the mechanical resistance of these series of fingers when the device is placed on the winding of the stator.

According to an aspect of the invention, each finger of each series of fingers comprises at least a hole where a pin is fixed, each pin being configured to cooperate with one of the cams. Each cam consists in a gutter where the pins are inserted in. Each pin is linked to each finger without any degree of freedom. Thus, when the pin is set in motion, the finger is also set in motion.

Each cam, further to the rotation of the first rotative ring or the second rotative ring, set in motion each pin which interacts with such cam. It results both from such an interaction between the cams and the pins and from a radial guidance of the fingers that the fingers are set in a radial motion by the rotative rings.

Thus, when the first rotative ring is in a rotatory motion, each pin of the first series of fingers follows the circular form with ripples of the first cam and each pin of the second series of fingers follows the circular form with ripples of the second cam.

According to an aspect of the invention, the pin of each finger of the first series of fingers and of the second series of fingers interacts with one of the cams of the first rotative ring, each guiding grooves of the circular support comprising an oblong opening configured to authorize the crossing of such pins to interact with the cams. As said previously, the circular support is located between the rotative rings. Thus, one of the rotative rings, for example the first rotative ring, is arranged facing a bottom of the circular support. In such situation, each pin of the fingers which has to interact with the first rotative ring should cross the circular support. Each pin being fixed to each finger, each guiding groove has to include an opening in its bottom, so that the pin of each finger which are arranged against each bottom of each guiding groove, meaning the fingers of the first series of fingers and the second series of fingers, can interact with the cams of the first rotative ring. Such opening is oblong in order to authorize the radial movement of the pins and consequently the radial movement of the fingers.

According to an aspect of the invention, the first cam of the first rotative ring is configured to receive the pin of each finger of the first series of fingers, and the second cam of the first rotative ring is configured to receive the pin of each finger of the second series of fingers. Even if the pin of each finger of both first series of fingers and second series of fingers interacts with the first rotative ring, the pins of the first series of fingers and the pins of the second series of fingers do not interact with the same cam. Thus, there is a radial offset between the pins of the first series of fingers and the pins of the second series of fingers to avoid any mechanical interferences. Consequently, there is a radial offset between the position of an oblong opening in a groove of the circular support receiving a finger of the first series of fingers and an adjacent groove of the circular support receiving a finger of the second series of fingers.

The ripples allow to create a motion of the pin, such motion being establish by the dimensions of the oblong opening and by the dimensions of the ripples.

According to an aspect of the invention, the pin of each finger of the third series of fingers is configured to interact with one of the curved cams of the second rotative ring. As for the pins of the first series of fingers and the pins of the seconds series of fingers, there is a mechanical interaction between the pins of the third series of fingers and the corresponding cams. The third series of fingers interacts with the second rotative ring, which is at the opposite side of the first rotative ring with respect to the circular support. Thus, the pins of the third series of fingers protrude from the fingers without need of openings in the circular support as for the pins of both first series of fingers and second series of fingers.

According to an aspect of the invention, the curved cams are configured such that there is a angularly offset between their two ends and the fingers of the third series of fingers are configured such that there is a radial offset between a pin of a finger of the third series of fingers and the pin of the adjacent finger of the third series of fingers. It results from such a combination of features that adjacent two fingers of the third series of fingers can interact with the same curved cam.

According to an aspect of the invention, the device comprises means for rotating which are configured to activate the first rotative ring and the second rotative ring.

Such means for rotating allow the rotative motion of the rings and further the radial motion of the series of fingers in order these fingers to ensure their respective functions.

The means for rotating of the device can comprise manual element, for example levers or cranks. The means for rotating also can be activated by a servomotor, which increase the precision of the rotation.

According to an aspect of the invention, the device comprises clamping means configured to maintain an angular position of the first rotative ring and the second rotative ring. The clamping means permit to maintain the position of the fingers during the welding operation, such that pressure against the segments of a pair and space between segments which should not be welded together are maintained all along the welding operation. The clamping means can be some screws if the device is manually adjustable. If the means for rotating are activated by the servomotor, the latter can block the rotative rings and can be used as clamping means.

The invention also covers a process of positioning of electrically conductive segments of a winding of a stator of a rotary electrical machine, executed by a device as described above, comprising:
- a first step of placing the device on the winding by a translation along a revolution axis of the machine, in which segments of such winding are separated into pairs of segments thanks to the axial movement of at least first series of fingers and second series of fingers,
- a second step of rotating the first rotative ring around said revolution axis to set in motion in opposite radial directions both first series of fingers and second series of fingers in order to press at least two conductive segments of a pair of segments against each other before a welding operation of such pressed conductive segments of a pair of segments.

The process of the invention, with at least these two steps, allows the operator to ensure a correct position of each conductive segment before a welding operation, by both separating adjacent pairs of segments one from the other which have to be isolated one from the other and pressing against each other two segments of a pair of segments which have to be welded together.

According to an aspect of the invention, said opposite movements of both first and second series of fingers are delayed in time one compared to the other.

According to an aspect of the invention, said opposite movements of both first and second series of fingers ensure the pressure of each pair of segments which are located on the same radius of the rotary electrical machine relative to the revolution axis. Pairs of conductive segments which must be welded together may be distributed on two annular patterns, with an internal pattern and a external pattern, and according to the invention the opposite radial movements of first and second series of fingers at least ensure the contact against each other of segments of a pair simultaneously for each pair of one of the annular pattern.

According to an aspect of the invention, the process comprises a third step, subsequent to the second step, of rotating the second rotative ring to set in a radial motion the third series of fingers in order to at least radially align the segments of each pairs of segments.

Moreover, the radial movement of the third series of fingers may participate to the pressing of two conductive segments of a pair of segments against each other.

When movements of both first and second series of fingers may ensure the contact against each other of segments of a pair simultaneously for each pair of one of the annular pattern, the movement of third series of fingers combined with the movement of one of first and second series of fingers may ensure the contact against each other of segments of a pair simultaneously for each pair of the other annular pattern.

Such a process is optimal to make a correct welding, which consists in welding together the segments of each pair of segments, but without welding a pair of segments with another one.

Other features, details and advantages of the invention can be inferred from the specification of the invention given hereunder. Various embodiments are represented in the figures wherein:

FIG. 1 is a general view of a device for positioning electrically conductive segments of a winding of a stator according to the invention, FIG. 2 is an exploded view of elements of the device of FIG. 1 which notably illustrates a first rotative ring, a second rotative ring, and a circular support between both rotative rings, FIG. 3 is a detailed view of fingers of a first series of fingers and a second series of fingers which are parts of the device of FIG. 1, FIG. 4 is a detailed view of fingers of a third series of fingers which are parts of the device of FIG. 1, FIG. 5 is an exploded view of a setup of fingers of both first series of fingers and third series of fingers arranged between the circular support and the second rotative ring, FIG. 6 is an exploded view of a setup of fingers of both second series of fingers and third series of fingers arranged between the circular support and the second rotative ring, FIG. 7 is an illustration of a set of the process of the invention, wherein the device is placed on the winding of the rotary electrical machine, FIG. 8 is a detailed view of an interaction between some fingers of both first and second series of fingers and some electrically conductive segments, the fingers being in a resting position, FIG. 9 is a detailed view of an interaction between the fingers of both first and second series of fingers and the electrically conductive segments, the fingers being in a working position, FIG. 10 is a detailed view of an interaction between some fingers of the third series of fingers and some electrically conductive segments, the fingers of the third series of fingers being in a resting position, FIG. 11 is the same view as FIG. 10, with a partial view of the second rotative ring which makes visible cams associated to pins fixed to fingers, FIG. 12 is a detailed view of an interaction between some fingers of the third series of fingers and the electrically conductive segments, the fingers of the third series of fingers being in a working position, the second rotative ring being partially visible, FIG. 13 is the same view as FIG. 12, without the partial view of the second rotative ring.

FIG. 1 is a general view of a device 1 for positioning electrically conductive segments of a winding 5 of a rotary electrical machine, such machine being not illustrated in FIG. 1. The function of the device 1 is to allow a correct positioning of each segment of the winding 5 before an operation of welding of such segments in order to realize a continuous winding around a stator of the rotary electrical machine. Particularly, the device 1 is configured to first press against each other the segments which need to be welded together and also to provide space between segments which should not be welded together.

The device 1 comprises a first rotative ring and a first cover 21, a second rotative ring and a second cover 31, and a circular support 4. The first rotative ring is inserted in a first cover 21 and the second rotative ring is inserted in a second cover 31 such that rotative rings are not visible in FIG. 1. The circular support 4 is located between the two covers, being noted that the circular support is therefore located between the two rotative rings. The first cover 21 which comprises the first rotative ring, the second cover 31 which comprises the second rotative ring and the circular support 4 respectively comprise annular body and they are superposed one to the other with respect to the revolution axis 100 of the annular bodies. Said revolution axis 100 is the same as the rotating axis of the rotary electrical machine when the device 1 is placed on such machine during welding operation. The first cover 21, the second cover 31 and the circular support 4 can be fixed one to each other thanks to some fastening means 12, as screws for example.

The device 1 is configured such that each rotative ring can rotate inside their respective cover and around the revolution axis 100 whereas the circular support 4 remains in a stationary position. The first rotative ring and the second rotative ring respectively comprise at least one cam. Each cam is arranged on a surface of each rotative ring, such surface facing the circular support 4. Each rotative ring, and each cam by analogy, can be set in a rotary motion by means for rotating 9. Such means for rotating 9 can be a lever with a gear on one of its ends, said gear being arranged to interact with a toothed part of the rotative ring to initiate the rotary motion. Each rotative ring has its own means for rotating 9. Each means for rotating 9 can be controlled by a servomotor, which is not represented in the FIG. 1.

The means for rotating 9 can also act as clamping means 11. The clamping means 11 allow to maintain a position of the device during the operation of welding. As the means for rotating 9, the clamping means 11 can be used by the servomotor.

By rotating the first rotative ring and the second rotative ring, the means for rotating 9 are able to set indirectly in motion a first series of fingers 6, a second series of fingers 7 and a third series of fingers 8. These fingers interact with the above-mentioned cams of the rotative rings such that the rotating movement of the rings is changed in a radial motion of the three series of fingers. The radial movement of each finger is configured to move this finger from a resting position, which is the position of the finger during positioning the device on the winding, to a working position, which is the position of this finger during the welding operation in order to maintain in position the conductive segments to be welded together and the conductive segments to isolate one from the other. In other words, these radial motions of the series of fingers allow all the electrically conductive segments to be correctly positioned for the welding as it will be described later.

FIG. 2 is an exploded view of the device wherein first rotative ring 2, second rotative ring 3 and circular support 4 are illustrated but no series of fingers.

As described previously, the first rotative ring 2 is arranged in the first cover 21. The first cover 21 has a shape and dimensions for receiving the first rotative ring 2 and to authorize its rotation, more particularly in a housing delimited by the first cover 21. The first cover 21 may comprise means for guiding rotation of the first rotative ring 2 and means for maintaining the first rotative ring 2 inside the first cover 21. It has to be noted that same features apply to the second rotative ring 3 and the second cover 31.

Each rotative ring comprises at least one cam, such cams being oriented towards the circular support 4, to interact with the fingers which are arranged in the circular support 4 as it will be illustrated in the next figures. In other words, each rotative ring comprise an inner surface which is intended to be in contact with the circular support and an outer surface opposite the circular support 4, and the cams are realized by groove made in the inner surface of the corresponding rotative ring.

The stack of rings 2, 3 and circular support 4 is such that the circular support is located between the two rotative rings and that the first rotative ring 2 is facing the winding before using the device. In other words, when the device is placing on the winding according to an axial motion, and more precisely according to a translation along the revolution axis, the winding first cooperates with the first rotative ring 2, then the circular support 4, and finally the second rotative ring 3.

The first rotative ring 2 comprises a first cam 201 and a second cam 202. Such cams are globally circular and extend along the first rotative ring 2. The first cam 201 and the second cam 202 are concentric, an average radius of the first cam being superior to an average radius of the second cam 202. As it will be described later, these two cams comprise ripples which means that the radius of the first cam 201 and the second cam 202 are variable.

The first rotative ring 2 comprises a first toothed part 200 arranged at a peripheral edge of the ring. Such first toothed part 200 is configured to be link to the gear of one of the means for rotating which are illustrated at the FIG. 1. This gear transmission system allows the rotating movement of the first rotative ring and consequently the rotary motion of the first cam 201 and the second cam 202. Any other type of transmission system can be used as long as it gives a rotational motion to the rotative ring. The first cover 21 comprises a material removal in order to authorize a connection between the first toothed part 200 and the means for rotating described previously.

The circular support 4 comprises a first side 404 which is configured to face the inner surface of the first rotative ring 2 and a second side 405 which is configured to face the inner surface of the second rotative ring 3. The circular support 4 comprises a plurality of guiding grooves 401 which are spread all along the circular support 4. The guiding grooves 401 extend radially and they are formed in the material of the circular support 4 by digging the second side 405. Each guiding groove is at least partially oblong shape which is configured to receive at least two fingers of two of the three series of fingers. Each guiding groove is open towards a center of the circular support in order to authorize the radial motion of the fingers which are arranged in.

As said previously, each guiding groove 401 receive two fingers superposed one to the other, a depth of each guiding groove 401 being substantially equal to the sum of a height of two fingers superposed one to the other, said depth and height being considered relative to the direction of the revolution axis. The finger arranged at the bottom of the guiding groove 401 is configured to interact with the first rotative ring 2 meanwhile the finger arranged at the top of the guiding groove 401 is configured to interact with the second rotative ring 3.

In order to ensure an interaction between each finger arranged at the bottom of each guiding groove 401 and one of the cams of the first rotative ring 2, the bottom of each guiding groove 401 comprises an external oblong opening 402 or an internal oblong opening 403. The guiding grooves 401 are arranged such that a guiding groove 401 comprising an external oblong opening 402 is located between two guiding grooves 401 comprising an internal oblong opening 403 and vice-versa. When the first cover 21 and the circular support 4 are linked to each other, the external oblong openings 402 are facing the first cam 201 while the internal oblong openings 403 are facing the second cam 202. Thus, the fingers which are arranged in a bottom of a guiding groove 401 comprising an external oblong opening 402 interact with the first cam 201, while the fingers which are arranged in a bottom of a guiding groove 401 comprising an internal oblong opening 403 interact with the second cam 202.

The second rotative ring 3 comprises a plurality of curved cams 301. The curved cams 301 are regularly and angularly distributed along the second rotative ring 3. Each curved cam 301 is a gutter which extends from a first end which is close to an external peripherical end of the second rotative ring 3 to a second end which is close to an internal peripherical end of the second rotative ring 3. The curving of each curved cam 301 is offset in comparison with the radial direction of the second rotative ring 3. Thus, the first end of the curved cam 301 is angularly offset in comparison with the second end of that same curved cam 301 in order to extend the length of the curved cams and consequently the radial motion of the fingers which interact with the curved cams 301. The curved cams 301 are arranged one next to another, so that a radius of the second rotative ring 3 cuts a plurality of curved cams 301.

As the first rotative ring 2, the second rotative ring 3 also comprises a toothed part, more particularly a second toothed part 300, which is arranged to interact with one of the means for rotating illustrated at the FIG. 1. The second cover 31 comprises a material removal in order to authorize a connection between the second toothed part 300 and the means for rotating described previously.

FIGS. 3 and 4 are some views of the different fingers of the three series of fingers. All these fingers are configured to be set in a radial motion in order to adjust the position of the winding of the stator before and during welding operation.

FIG. 3 illustrates a finger of the second series of fingers 7 between two fingers of the first series of fingers 6. In the FIG. 3, the fingers are oriented as if they are arranged in three adjacent guiding grooves of the circular support. Each finger is arranged according to an alternate manner, with a finger of the second series of fingers 7 being adjacent to two fingers of the first series of fingers 6, and vice versa.

Each finger extends according to a longitudinal direction, which is common to the radial direction of the guiding groove where each finger is arranged in.

All the fingers illustrated in the FIG. 3 comprise an oblong part. More particularly the fingers of the first series of fingers 6 comprise a first oblong part 605, and the finger of the second series of fingers 7 comprises a second oblong part 705. These oblong parts are dimensioned in order to be arranged inside the guiding grooves of the circular support. The shape of the guiding grooves matches with the shape of the oblong part of the fingers so that only a radial motion of the fingers is authorized.

Each oblong part of the fingers of the first series of fingers 6 and the second series of fingers 7 comprises a hole which is arranged differently in function of each series of fingers. Thus, the fingers of the first series of fingers 6 comprise a first hole 602 and the fingers of the second series of fingers 7 comprise a second hole 702. The first hole 602 and the second hole 702 are radially offset one to the other, in order that each hole of each finger of series of fingers is facing each oblong opening of each guiding grooves where such fingers are arranged in. The function of the hole of each finger will be describing in details thereafter.

At the opposite of each oblong shape, each finger comprises a plurality of transversal protrusions. By transversal, it means that the protrusions extend substantially perpendicular to the longitudinal dimension of each finger.

The fingers of the first series of fingers 6 comprise two transversal protrusions, and more particularly an internal protrusion 604 and a first external protrusion 603. The internal protrusion 604 transversally extends on both side of each finger and is arranged at the longitudinal end of the fingers of the first series of fingers 6. The first external protrusion 603 also transversally extends on both side of each finger and is arranged between the longitudinal end and the first oblong part 605.

The fingers of the second series of fingers 7 comprise one transversal protrusion, and more particularly a second external protrusion 703 which transversally extends on both side of each finger and which is arranged at the longitudinal end of the fingers of the second series of fingers 7.

The longitudinal dimension of the fingers of the first series of fingers 6 is superior to the longitudinal dimension of the fingers of the second series of fingers 7. Thus, the first external protrusion 603 and the second external protrusion 703 are both transversally extended in order to interact one to another. More precisely, before the first rotative ring is moved which means that the fingers are in a resting position, as represented in the FIG. 3, the first external protrusions 603 and the second external protrusions 703 are in the same radial position, meaning that they are at the same distance from the revolution axis.

As it may be seen in FIG. 3 or FIG. 10, the ends of the first external protrusions 603 and the second external protrusions 703 are beveled in order to make a stop to the radial motion when the fingers of both first and second series are moved from their working position to return to their resting position, wherein external protrusions of adjacent fingers have to be at the same radial position.

Additionally, at least one external protrusion of two adjacent fingers can comprise a face perpendicular to the revolution axis wherein material have been removed in order to allow a partially recovering of the adjacent finger. In other words, the external protrusions of two adjacent fingers are configured to be in superimposition one to the other at the free end of such protrusions. Such superimposition allows to increase the surface of the protrusions which may be in contact with the segments without creating mechanical interferences between each adjacent finger.

The oblong part of the fingers of both first series of fingers 6 and second series of fingers 7, and each external protrusion of the fingers of both first series of fingers 6 and second series of fingers 7 form a slot 10. The slot 10 is formed between a finger of the first series of fingers 6 and a finger of the second series of fingers 7. Each slot 10 is configured to receive a pair of segments of the winding of the stator when the device is putting on it. A pair of segments can also be received in a zone 18, which is created between the first external protrusion 603 and the internal protrusion 604 of each finger of the first series of fingers 6.

FIG. 4 is a view of the different types of fingers of the third series of fingers 8. As it will be illustrated thereafter, the fingers of the third series of fingers 8 are configured to be superposed to the fingers of the first series of fingers and the fingers of the second series of fingers.

The third series of fingers comprises some long fingers 804 and some short fingers 805. The long fingers 804 and the short fingers 805 are distinguishable by their respective longitudinal dimension, corresponding to their main direction as for the other fingers. The long fingers 804 are configured to be superposed to the fingers of the first series of fingers meanwhile the short fingers 805 are configured to be superposed to the fingers of the second series of fingers.

The long fingers 804 and the short fingers 805 have a similar part, which is a third oblong part 808. As the oblong parts of the fingers of both first series of fingers and second series of fingers, the third oblong part 808 is configured to be arranged inside the guiding grooves of the circular support. Each third oblong part 808 comprises an external hole 802 and an internal hole 803.

At the opposite side of the third oblong part 808, each type of fingers of the third series of fingers 8 comprises a strip. Such strip is transversally offset such that a shoulder 809 is realized. Such shoulder 809 is configured as a radial stop. The offset of the strip allows an insertion of the strip between the pair of segments when the fingers of the third series of fingers 8 are set in a radial motion.

The long finger 804 and the short finger 805 are distinguished by the longitudinal dimension of their strip. The long finger 804 comprises a long strip 806 and the short finger 805 comprises a short strip 807. Each strip is tapered shape, with its transversal dimension which is more and more thin from the shoulder 809 to the longitudinal end of each finger.

FIG. 5 is an exploded view of an arrangement of a finger of the first series of fingers 6. As mentioned previously, each finger of the first series of fingers 6 is covered by a long finger 804 of the third series of fingers 8.

To ensure the operating of the device, the fingers of the first series of fingers 6 have to be arranged in a guiding groove 401 comprising an external oblong opening 402.

First hole 602 of the finger of the first series of fingers 6 is used for the insertion and the fixation of a first pin 601 which interacts with one of the cams of the first rotative ring 2, here the first cam 201. The first pin 601 is fixed inside the first hole 602, for example by gluing, in order to extend only from one side of the corresponding finger and such finger is arranged in the guiding groove such that first pin is directed towards the bottom of the guiding groove 401.

The first pin 601 has a main size, perpendicular to the main plane of the corresponding finger, such that it can extend until the first cam 201 through the circular support 4. To ensure it, the first hole 602 is facing the external oblong opening 402, so that the first pin 601 can cross the guiding groove 401 via the external oblong opening 402 and can be inserted inside the first cam 201.

A diameter of the first pin 601 is substantially equal to the small dimension of the external oblong opening 402. Thus, the only degree of freedom of the first pin 601 authorized by the circular support 4 is the long dimension of the external oblong opening 402 which corresponds to the radial direction of the device.

A long finger 804 of the third series of fingers 8 is superposed to the finger of the first series of fingers 6. The same is applied for every finger of the first series of fingers 6 arranged in the circular support 4. The long finger 804 is configured to cover the finger of the first series of fingers 6 all along its longitudinal main size. Thus, the long finger 804 allows a support for the finger of the first series of fingers 6 when the device is putting on the winding of the stator as it will be explained later with the description of the process.

The long finger 804 comprises a third pin 801 which is fixed inside the internal hole 803, for example by gluing, such that it only extends from one side of the long finger, towards the second rotative ring 3. The third pin 801 has a main size such that it can extend until one of the curved cams 301 of the second rotative ring 3.

Such layout is similar for the locating of the fingers of the second series of fingers 7 and the short fingers 805 of the third series of fingers 8 in the guiding grooves, as illustrated in FIG. 6. The fingers of the second series of fingers 7 have to be arranged inside a guiding groove 401 which comprises an internal oblong opening 403. A second pin 701, which is fixed inside the second hole 702, can thereby cross the guiding groove 401 via the internal oblong opening 403. More particularly, every second pins 701 of every finger of the second series of fingers 7 cross the circular support 4 in order to interact with the second cam 202 of the first rotative ring 2.

Each short finger 805 of the third series of fingers 8 is superposed on each finger of the second series of fingers 7. As for the long fingers and the fingers of the first series of fingers, the longitudinal dimension of the short fingers 805 is configured to cover the finger of the second series of fingers 7 all along its longitudinal main dimension. A mentioned above, the short finger 805 allows a support for the finger of the second series of fingers 7 when the device is putting on the winding of the stator.

The third pin 801 of the short finger 805 is arranged and fixed inside the external hole 802 and this third pin interacts with one of the curved cams 301 of the second rotative ring 3. The radial offset between the third pin 801 of the long fingers and the third pin 801 of the short fingers 805 will be justified thereafter.

FIG. 7 illustrates how the device 1 is placed on the winding 5 extending from an axial end of a stator 19 of the rotary electrical machine. Such winding 5 comprises a plurality of lines of segments, each line of segments being realized by a radial alignment of segments which are located between two consecutive teeth of the stator 19. To form a continuous winding, adjacent lines of segments should be isolated one from the other and segments of a same line should be welded together by pairs. As illustrated, each radial line of segments comprises four segments forming an external pair of segments 51 and an internal pair of segments 52. The function of the device is to ensure that the welding operation allows to link the segments of a pair of segments one to another without linking a plurality of pairs of segments together.

First the device 1 is placed on the winding 5 according to an axial motion 20, in order to initiate interactions between the series of fingers and the pairs of segments. Such axial motion 20 is parallel to the revolution axis 100 of the device 1 and to a main direction of end of each segment.

When the device 1 is placed on the winding 5, conductive segments to be welded together of this winding are already grouped by pairs of segments, with a theorical space between each pair, such that fingers may be inserted between pairs of segments. But the segments may be not in their theorical position and may form an obstacle to free axial movement of the device. The first rotative ring is thus the first compound of the device to be in contact with such segments and the fingers of the first series of fingers and the second series of fingers can bent under the contact load. The resting position of the fingers of the third series of fingers, wherein said fingers recover the fingers of the first rotative ring, ensure a limitation of the bending of the fingers of the first series of fingers and the second series of fingers in order to prevent these fingers of the first rotative ring to break during the positioning of the device on the winding.

FIG. 8 illustrates some interactions between two fingers of the first series of fingers 6, one finger of the second series of fingers 7, and four pairs of segments, namely a first external pair of segments 501, a second external pair of segments 502, a first internal pair of segments 503 and a second internal pair of segments 504. In the FIG. 8, each oblong part of each finger appears in transparency in order to clarify the interactions between each pin and each cam of the first rotative ring 2. For the same reason of clarity, the circular support is not illustrated.

When the device is placed on the winding, each external pair of segments slides inside each slot 10 formed by the cooperation of a finger of the first series of fingers 6 and an adjacent finger of the second series of fingers 7, which are arranged according to an alternate manner. As mentioned above, each slot 10 is longitudinally and transversally defined by both adjacent fingers of first series of fingers 6 and second series of finger 7. Concerning the internal pairs of segments, they are arranged in the zone 18, between each external protrusion 603 of fingers of the first series of fingers 6 and each internal protrusion 604 of fingers of the first series of fingers 6.

In FIG. 8, the fingers of the first series of fingers 6 and the fingers of the second series of fingers 7 are in the resting position mentioned above, but, thanks to the positioning of the device on the winding as represented in the FIG. 7, it already guarantees to separate some pairs of segments between them. As an example, the fingers of the second series of fingers 7 allows to create a separation between the first external pair of segments 501 and the second external pair of segments 502. As another example, the cooperation between the fingers of the first series of fingers 6 and the fingers of the second series of fingers 7, more particularly between the first external protrusion 603 and the second external protrusion 703, allows to create a separation between the first external pair of segments 501 and the first internal pair of segments 503, and between the second external pair of segments 502 and the second internal pair of segments 504.

In FIG. 8, thanks to the transparency of the oblong parts of each finger, it is also possible to see that the first pins 601 of the fingers of the first series of fingers 6 are inserted inside the first cam 201, and the second pins 602 of the fingers of the second series of fingers 7 are inserted inside the second cam 202.

The first cam 201 and the second cam 202 comprise some ripples. In other words, the radius of each cam is variable. These ripples are slight but sufficient to create a radial motion of each pin, and by analogy each finger.

When the first rotative ring 2 is set in motion, the first cam 201 and the second cam 202 are consequently set in a first rotary motion 13, as show in the FIG. 9. When the first cam 201 and the second cam 202 are rotating, each pin is sliding inside its cam. Considering that the fingers are maintained in the corresponding guiding groove with a shape matching allowing only a radial motion of the finger, the sliding of the pins along the ripples of each cam produces a movement of each pin and each finger in a radial motion inside the guiding groove. More particularly, the fingers of the first series of fingers 6 move according to a first radial motion 14, and the fingers of the second series of fingers 7 move according to a second radial motion 15. Even if both series of fingers are set in motion by the same rotative ring, the first radial motion 14 and the second radial motion 15 are in opposite direction. When the fingers of both first series of fingers 6 and second series of fingers 7 are in their resting position, each first pin 601 is in a hollow part of the ripples of the first cam 201 which is closer to the revolution axis than a boss part of the ripples of the first cam 201 where the first pin 601 is moved thanks to the first rotary motion 13. In its resting position, each second pin 701 is in a boss part of the ripples of the second cam 202 which is further to the revolution axis than a hollow part of the ripples of the second cam 202 where the second pin 701 is moved thanks to the first rotary motion 13.

Moreover, in this resting position, the distance between each first pin 601 and the next boss part of the ripples of the first cam 201 is smaller than the distance between each second pin 701 and the next hollow part of the ripples of the second cam 202. It results from such an angular offset between the resting position of pins in the first cam 201 and the second cam 202 that the first series of fingers 6 is set in a radial motion before that the second series of fingers 7 is set in an opposite radial motion. Such a time shift may avoid some mechanical interferences which could happen if the two radial motion are simultaneous.

Due to the first radial motion 14, the fingers of the first series of fingers 6 interact with every pair of segments. More particularly, each pair of segments is set in a radial motion in the same direction of the first radial motion, thanks to the contact of first external protrusions 603 and internal protrusion 604 with each annular row of pairs of segments.

During the first rotary motion 13, the fingers of the second series of fingers 7 are set in motion according to the second radial motion 15. Thus, the second external protrusion 703 pushes the internal pairs of segments against the internal protrusions 604 of each adjacent finger of the first series of fingers 6. Such internal pairs of segments being already set in motion by the internal protrusion 604 of the fingers of the first series of fingers, each segment of all the internal pairs of segments are pressed one to another, according to the invention. Moreover, a shoulder of the finger of the second series of fingers 7 reaches with a segment of the first external pair of segments.

By pressing the segments of these pairs of segments one to another, the first series of fingers 6 and the second series of fingers 7 also increase the space between the external pairs of segments and the internal pairs of segments.

FIGS. 10 to 13 illustrate the function of the fingers of the third series of fingers 8 and their interaction with each pair of segments of the winding. To facilitate the comprehension of such interaction, FIGS. 11 et 12 illustrates at least partially the second rotative ring 3 and the curved cams 301, meanwhile said second rotative ring 3 and curved cams 301 are not illustrated on FIGS. 10 and 13.

As mentioned above, the fingers of the third series of fingers 8 are superposed to the fingers of the first series of fingers and the fingers of the second series of fingers, whose the protrusions are visible on all these four figures. The first series of fingers and the second series of fingers are in working position, as showed in the FIG. 9, so that they press the segments of each pair of segments one to another and participate to separating each pair of segments from the others.

Concerning the FIG. 10, the fingers of the third series of fingers 8 are in their respective guiding groove 401 of the circular support 4. The long fingers 804 are superposed to the fingers of the first series of fingers and the short fingers 805 are superposed to the fingers of the second series of fingers. Each third pin 801 is radially offset one to the other, as mentioned previously.

Such radial offset of the third pins can be explained regarding the FIG. 11. Two third pins 801 are inserted in one curved cam 301. Thus, thanks to the offset of the third pins 801 relative to each other, the device requires a number of curved cams 301 equal to half the number of third pins 801 and consequently of third fingers. A sufficient space between two consecutive curved cams may thus be provided such that the circular support 4 may be resilient enough to support both rotative rings. In this situation, each third pin 801 which is fixed in each external hole 802 is arranged at the first end, which is close to the external peripherical end of the second rotative ring 3, of each curved cam 301 meanwhile each third pin 801 which is fixed in each internal hole 803 is arranged at distance from the first end of each curved cam 301.

Once the first series of fingers and the second series of fingers are in working position, it is the second rotative ring 3, and consequently the curved cams 301, which are set in motion by its means for rotating, according to a second rotary motion 16 as illustrated in the FIG. 12. Such second rotary motion 16 is more extended than the first rotary motion of the first cam and the second cam, because the second rotary motion needs to set all the fingers of the third series of fingers 8 according to a third radial motion 17 more extended than the second radial motion of the second series of fingers described previously. Such a third radial motion 17 must be long enough for all the fingers of the third series of fingers, and more particularly their strip, to have their free end beyond the innermost of the pairs of segments.

During the second rotary motion 16, each third pin 801 follows the curve of each curved cam 301 until that each third pin 801 which is fixed in each internal hole 803 reaches the second end of each curved cam 301, which is close to the internal peripherical end of the second rotative ring 3.

Considering that the fingers are maintained in the corresponding guiding groove with a shape matching allowing only a radial motion of the finger, the sliding of the pins along the ripples of each cam produces a movement of each pin and each finger in a radial motion inside the guiding groove. The result is the third radial motion 17 of all the fingers of the third series of fingers 8.

When the fingers of the third series of fingers 8 are set in a radial motion, each strip slides between two adjacent external pairs of segments and between two adjacent internal pairs of segments. As an example, the short strip 807 illustrated in FIG. 12 or 13 has slid between the first external pair of segments 501 and the second external pair of segments 502, and between the first internal pair of segments 503 and the second internal pair of segments 504. Such sliding, which is facilitated by the tapered form of each strip, allows to radially align each segment of each pair of segments between them and increase the space between each pair of segments.

Moreover, when the fingers of the third series of fingers 8 are set in a radial motion, each shoulder 809 of each finger of the third series of fingers 8 comes to press against each external pair of segments in order to participate to such correct pressing.

After that, the position of each rotative ring is frozen thanks to the clamping means, so that all the segments of the winding are correctly positioned for the welding. Such correct positioning is illustrated in FIG. 12 or 13. Indeed, each pair of segments is correctly separated from the other pairs, and the segments of each pair of segments are pressed one to the other and radially aligned. Thus, the welding can be optimal, with only the segments of each pair of segments being welded one to the other.

When the welding is done, all the step described up to now are processing in a reverse order, and the device can be removed from the winding.

It will be understood from the foregoing that the present invention provides a device for positioning segments of a winding of a stator in order to ensure an optimal welding. Further, such a device could be adapted to electrically conductive segments of different dimensions by adjusting the radial movement of the finger without changing all the tools.

However, the invention cannot be limited to the means and configurations described and illustrated herein, and it also extends to any equivalent means or configurations and to any technically operative combination of such means.

For example, the device described here above is used for two annular patterns of pairs of conductive segments but could be adapted, for example by adding protrusions, for being used with more than two annular patterns of pairs of conductive segments such as three or four.

The invention claimed is:

1. A device for positioning electrically conductive segments of a winding of a stator of a rotary electrical machine, comprising:
   at least one rotative ring with at least one cam arranged around a revolution axis, the at least one rotative ring being arranged to set in a radial motion at least two series of fingers to ensure the position of the conductive segments, wherein the at least two series of fingers are set in motion in opposite directions one to the other, such that a finger of a first series of fingers and a finger of a second series of fingers are configured to press two conductive segments of a pair of segments against each other; and
   a circular support with a plurality of guiding grooves configured to receive the series of fingers, wherein the first series of fingers and the second series of fingers are arranged in the plurality of guiding grooves such that the fingers of the first series of fingers and the fingers of the second series of fingers are arranged one to the other according to an alternate manner.

2. The device according to claim 1, comprising a first rotative ring and a second rotative ring, the first rotative ring being configured to set in a radial motion both the first series of fingers and the second series of fingers, the second rotative ring being configured to set in a radial motion a third series of fingers.

3. The device according to claim 2, wherein the third series of fingers is configured to radially align the segments of each pair of segments.

4. The device according to claim 2, wherein each finger of the third series of fingers comprises a shoulder configured to participate to the pressing of two conductive segments of a pair of segments against each other.

5. The device according to claim 2, wherein the first rotative ring comprises a first cam which is configured to cooperate with each finger of the first series of fingers and a second cam which is configured to cooperate with each finger of the second series of fingers.

6. The device according to claim 5, wherein the first cam and the second cam have a circular and concentric form with ripples.

7. The device according to claim 5, wherein the first cam and the second cam are angularly offset one to the other, such offset being configured to shift time of the movement of the first series of fingers relative to the movement of the second series of fingers.

8. The device according to claim 2, wherein the second rotative ring comprises a plurality of curved cams regularly and angularly distributed.

9. The device according to claim 2, wherein the circular support is inserted between the first rotative ring and the second rotative ring.

10. The device according to claim 2, wherein each guiding groove is configured to receive a finger of the third series of fingers and a finger of one of the first or the second series of fingers.

11. The device according to claim 10, wherein the third series of fingers comprises long fingers and short fingers, such long fingers being superposed to the fingers of the first series of fingers in each guiding groove, such short fingers being superposed to the fingers of the second series of fingers in each guiding groove.

12. The device according to claim 1, wherein each finger of the first series of fingers and of the second series of fingers comprises a plurality of transversal protrusions.

\* \* \* \* \*